United States Patent [19]

Godart

[11] 4,221,418
[45] Sep. 9, 1980

[54] APPARATUS FOR HANDLING A COVER OF A STEAM GENERATOR IN AN ELECTRO-NUCLEAR STATION

[75] Inventor: Joseph-Raoul L. G. G. Godart, Montignies-le-Tilleul, Belgium

[73] Assignee: Ateliers J. Hanrez S.A., Belgium

[21] Appl. No.: 922,212

[22] Filed: Jul. 5, 1978

[30] Foreign Application Priority Data

Nov. 24, 1977 [BE] Belgium ............................. 182909

[51] Int. Cl.² ............................................. B66C 1/62
[52] U.S. Cl. ................................... 294/90; 294/86 A
[58] Field of Search ................. 294/90, 86 A, 86.13; 176/87, 30

[56] References Cited
U.S. PATENT DOCUMENTS 3,193,317   7/1965   Guyant ............................. 294/90

FOREIGN PATENT DOCUMENTS 2524244   9/1976   Fed. Rep. of Germany ........ 294/86 A
1403894   5/1965   France .

*Primary Examiner*—James B. Marbert
*Attorney, Agent, or Firm*—Stevens, Davis, Miller & Mosher

[57] ABSTRACT

The apparatus comprises a rigid frame which can rock about a fixed shaft and on which is mounted a transfer mechanism for imparting a translatory movement to the heavy plug so as to uncover the opening of the generator without irradiation of the personnel.

A tool system for loosening the fixing nuts of the plug, as well as mechanical means for supporting or driving the sealing disc if the latter is separate from the plug, can be temporarily attached to the mechanism.

7 Claims, 9 Drawing Figures

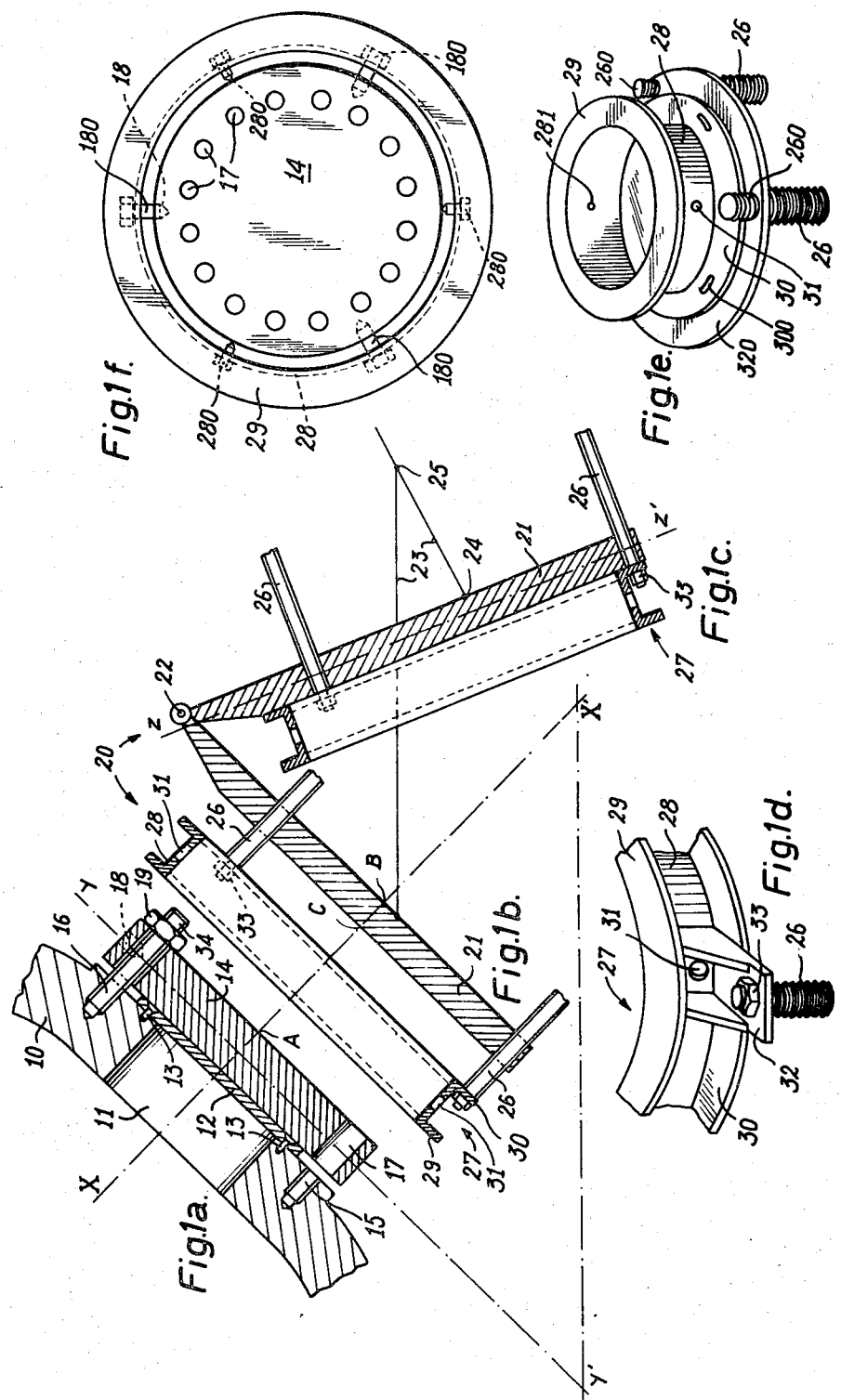

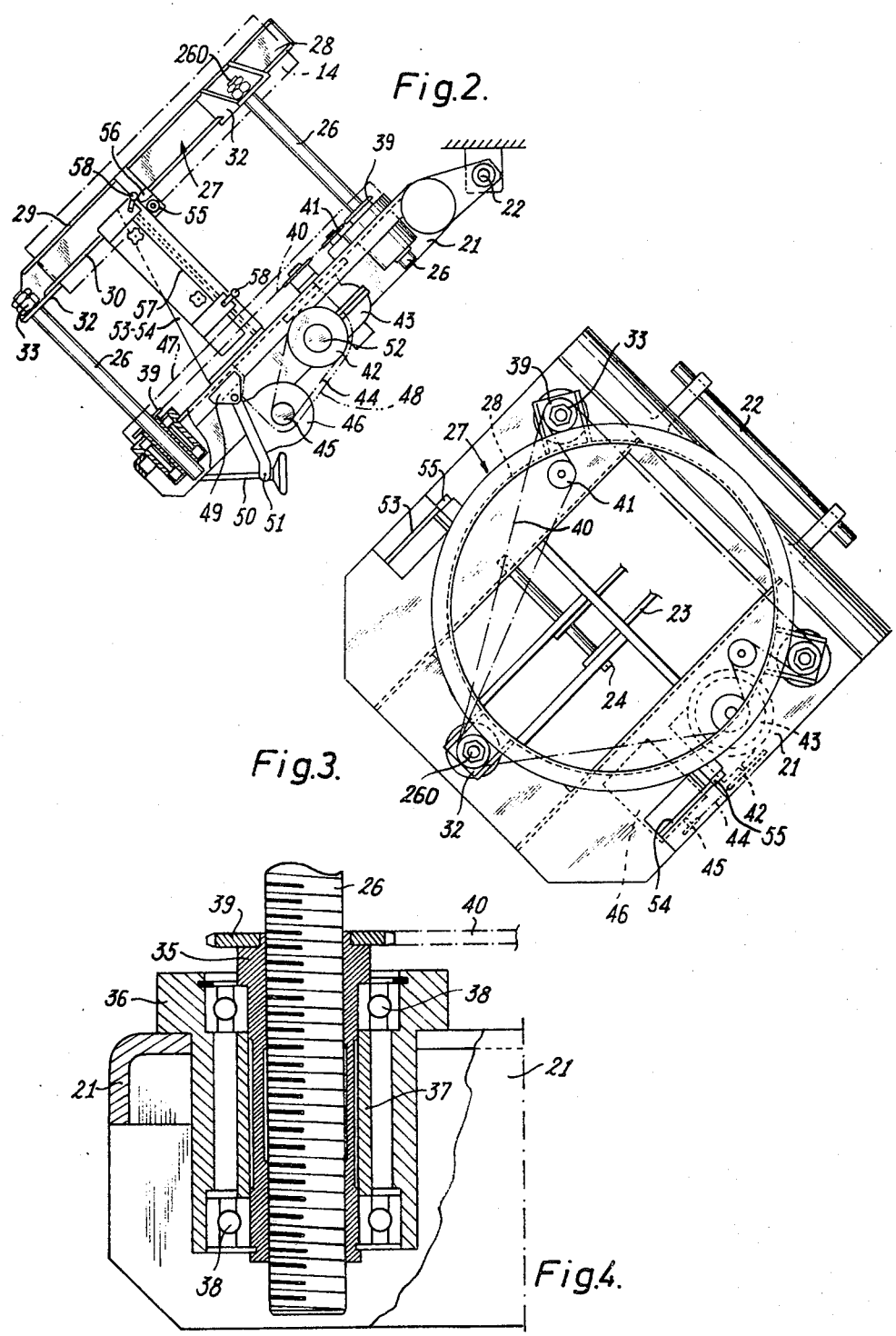

APPARATUS FOR HANDLING A COVER OF A STEAM GENERATOR IN AN ELECTRO-NUCLEAR STATION

The invention relates to a handling apparatus for facilitating and accelerating the removal and fitting of a heavy cover which is difficult of access and the removal of which involves the risk of releasing harmful radiations. The invention is concerned more particularly with a conventional double-walled cover of either a steam generator in an electronuclear station or a pressurizing unit in such a station.

The steam generator is an enclosure which is disposed with its main axis vertical, is closed at its ends by domed steel end-plates of great thickness and is traversed, on the one hand, by a stream of pressurized water called the primary closed circuit which is previously heated during its passage through the reactor and, on the other hand, by a stream of water called the secondary closed circuit, which is converted into steam by heat-exchange upon contact with the primary circuit and which supplies the turbines of the station.

For the purpose of carrying out periodic inspection and maintenance work on the generator (or pressurizing unit), and two circuits are voided and, with the personnel keeping their distance, remote-controlled apparatus, adapted to inspect the pipes and, when necessary, to stop leaks therein, are introduced into the enclosure through openings formed in the base of the lower end-plate.

Each opening in a stream generator or pressurized unit is closed by a cover, disposed in a plane which normally forms an angle of 45° with the horizontal. The cover comprises two superposed discs, the first of which is fitted to the envelope to seal the enclosure, whereas the second is disposed at the rear of the first to enable the latter to resist the high pressure obtaining in the enclosure.

In a conventional type of closure means, the two discs are separate and form a double-walled cover. The first disc, which is known as the sealing disc and is of small thickness and generally made of stainless steel, is secured directly to the envelope by means of screw-bolts. The second disc, called the plug, which has a greater diameter and thickness than those of the sealing disc, is fitted around the latter and is secured to the envelope by means of bolts and nuts. To uncover the openings, it is obviously necessary to remove the plug and then the sealing disc.

In another type of closure means, the two discs are solidly interconnected and in fact form a single cover element; in this case it suffices to loosen the fixing screws of the plug for the purpose of uncovering the opening in the enclosure.

Since the enclosure, even when empty of water, is radioactive, the personnel responsible for removing the disc or the two discs, so as to uncover the opening, must wear protective clothing and a gas-mask or respirator, and this greatly interferes with their movements; however, the dimensions, weight and disposition of the plug render its handling difficult in a space which is often confined and in surroundings which are unpleasant because of the hot and humid atmosphere obtaining in this area.

It was therefore then necessary to design means suitable for facilitating and accelerating the handling operations. For this purpose, it has been proposed to fit, permanently and close to each inspection and maintenance opening, a robust and reliable handling means, certain parts of which can be readily connected or detached, particularly those parts which are vulnerable to the severe atmosphere obtaining in the vicinity of the envelope.

The present invention relates to a handling apparatus for facilitating and accelerating the removal and fitting of a heavy cover, particularly a conventional cover either of the double-walled type or of the single-walled type comprising two superposed discs secured over an access opening formed in the envelope for carrying out periodical inspection and maintenance work on the enclosure of either a steam generator or a pressurizing unit of an electro-nuclear station, one of the discs being fitted on the envelope to seal it off, whereas the other, known as the plug and being wider and thicker than the first, is held against the first disc by bolts and fixing nuts to enable the first disc to resist the high pressure obtaining in the envelope and has radially extending tapped blind-end holes for securing it to a transfer device.

The apparatus comprises, firstly, a rigid frame, called a hinge, movable about a fixed axis by a rocking piston-and-cylinder unit attached laterally to the hinge and applied against a fixed point so as to position the hinge in a precise and reproducible manner about the vertical, either to one side of the latter in a "bottom" position parallel to the plan of the double-walled cover, or to the other side in a "top" position, secondly, a transfer mechanism formed by three screw-bolts, perpendicular to the plane of the longitudinal axis of the hinge and called control screw-bolts, which are advantageously arranged in an equilateral triangle and are each in engagement with a nut, called a control nut, mounted in a roller-bearing unit of a mounting integral with the hinge, each nut carrying a toothed wheel and the wheels being interconnected by a chain which may be driven either by an electro-mechanical unit or by a hand pulley, which unit or pulley is secured to the hinge so as to drive the control nuts in synchronism in situ and thus to impart to the control screws a translatory movement in one direction or the opposite direction between the envelope and the hinge, and thirdly, a load-transfer means, detachably secured by nuts to the transfer mechanism, and adapted to transfer the two discs from the envelope to the upper position and vice versa, and also adapted to transfer the tools required for mechanically removing and fitting said discs.

The electro-mechanical unit for driving the control screw-bolts comprises an electric motor able to turn in both directions, a toothed or notched belt, a reducing worm-wheel carrying a sprocket wheel engaging the chain, and means for tensioning the belt; the sprocket wheel may be equipped with a handle for continuing movement of the chain by hand in the event of breakdown of the motor.

The load-transfer means may be equipped with two rollers adapted to move, between two limit contacts, on two guide ramps solidly connected to the hinge, the vertical components of the weight of the transfer means thus being taken up by the rollers.

The apparatus comprises, as the transfer means, an open rigid surround advantageously formed by a flanged member of annular cross-section having a diameter greater than that of the plug and having formed therein untapped holes arranged in the same way as the tapped blind-end holes in the plug so that the surround can be secured around the plug by means of screw-bolts, and the surround either being secured on a support ring having a diameter greater than that of the surround and having holes arranged in the same way as the control screw-bolts, or comprising three iron flats having holes arranged in the same way as said screw-bolts, so that the upper ends of the screw-bolts can be fitted and double nuts screwed on to the screw bolts, the surround thus being removably secured to the transfer mechanism and being able to drive the plug away from the envelope to the hinge and vice versa.

The surround may drive the sealing disc together with the plug when the enclosure is sealed by a cover which is of the single-walled type, i.e. having a sealing disc solidly connected to the plug.

The apparatus comprises, as the load-transfer means, a tool plate, advantageously prepared beforehand, for loosening the nuts which secure the plug, when the plug is screwed on to the envelope and to the surround, and when the transfer mechanism is detached from the surround, the plate, removably connected to the transfer mechanism, being able to apply the tools to the plug and to move it to the bottom position.

The apparatus comprises, as the load-transfer means, a plate equipped with a means for retaining the sealing disc of a double-walled cover, i.e. a cover whose sealing disc is not solidly connected to the plug, over the opening by suction, magnetic or any other equivalent means, when the screw-bolts for securing said disc are not tightened in the corresponding tapped holes in the envelope and when, with the surround held, together with the plug, in the bottom position on the hinge by means of the control screw-bolts extending either through the support ring for the surround or through the iron flats, the plate is secured to the surround, said plate thus being removably connected to the transfer mechanism and being able either to hold the sealing disc over the opening and to move it away therefrom, or to advance it towards the opening and to apply it thereto.

The toothed or notched belt, the limit contacts for the surround, the cabinet for the electro-mechanical unit, the electric cables and all other components likely to be affected by the atmosphere obtaining in the vicinity of the enclosure are removably incorporated in the apparatus as a whole just for the purpose of handling the double-walled cover, but are normally held in readiness elsewhere between each two inspection and maintenance operations.

The accompanying drawings illustrate, by way of example, an embodiment of the invention.

In the drawings:

FIG. 1a is a sectional view through a cover of the double-walled type consisting of a sealing disc and a reinforcing disc called the plug, which cover is secured over an opening formed in the domed end-plate of a steam generator or pressurizing unit in an electro-nuclear station for inspection and maintenance purposes;

FIG. 1b and 1c are two diagrammatic sectional views of an apparatus comprising a rigid frame or hinge, a transfer mechanism and a surround for transferring the plug;

FIG. 1d is a perspective view of part of the transfer surround removably secured to the transfer mechanism by means of iron flats;

FIG. 1e is a perspective view of the FIG. 1d surround removably secured to the transfer mechanism by means of a support ring;

FIG. 1f is a plan view showing the mounting of the surround on the plug;

FIG. 2 is an elevational view of the apparatus;

FIG. 3 is a plan view of the FIG. 2 apparatus seen from the opening in the steam generator or pressurizer, and FIG. 4 is a sectional view through the transfer mechanism.

The envelope 10 (FIG. 1a), made of very thick steel, of a steam generator or pressurizing unit in an electro-nuclear station has two openings 11 at its domed base for the purpose of carrying out periodical inspection and maintenance work on the pipes contained in the envelope. One of these openings is illustrated in the drawings.

The opening is normally closed by a cover of the double-walled type comprising a relatively thin sealing disc 12 which is usually made of stainless steel; this disc is secured by screw-bolts 13, usually milled, fitted in holes formed in the disc and in the corresponding zone of the envelope. To increase the resistance of the disc 12, to which considerable pressure is applied, there is provided a second high-strength steel disc or plug 14 of considerable thickness; they may have a weight in the order of 500 kg. The transverse axis XX' and the longitudinal axis YY' of the plug generally form an angle of approximately 45° with the horizontal X'Y'.

To secure the plug 14, tapped blind-end holes 15, with which are associated screw-threaded bolts 16, will have been formed in the envelope. Plain holes 17 for receiving the bolts will have been drilled in the plug; furthermore, tapped blind-end holes 18, extending radially into the thickness of the plug will have been formed, and the plug 14 will have been clamped against the sealing disc 12 by tightening fixing nuts 19 on the bolts.

The removal and fitting of the cover for the purpose of carrying out inspection and maintenance work on the steam generator or pressurizing unit of necessity involve the possible risk of irradiation of the personnel, which risk increases with the length of time required for the operations. The object of the invention is to enable these operations to be carried out in the shortest possible time.

The apparatus 20, illustrated in part and diagrammatically in FIGS. 1b and 1c in particular, comprises a rigid frame 21 suspended from a fixed shaft 22 near the envelope, about which shaft the frame can be displaced by means of a piston-and-cylinder unit 23, which is advantageously powered electrically or pneumatically, and the end of which is attached laterally at the point 24 of the frame, whereas the piston-rod bears against a fixed point 25 which may be a universal-joint shaft. The frame 21 thus comprises a hinge, the longitudinal axis ZZ' of which may be arranged parallel to the axis YY' of the double-walled cover 12–14 (FIG. 1a) so that the apparatus occupies of "bottom" position (FIG. 1b); the hinge 21 can be said to be in the "top" position (FIG. 1c ) when the axis ZZ' is vertical or when it is inclined as shown in the sketch.

The apparatus in accordance with the invention comprises known means in the form of mechanical or optical stops, not illustrated in the drawings, for aligning the hinge in the top or bottom position in a precise and reproducible manner.

The apparatus is equipped with a translatory mechanism which comprises three control screw-bolts 26 (FIGS. 1b and 1c) which are perpendicular to the plane of the axis ZZ' and which, in this plane, form a preferably equilateral triangle, the screw-bolts preferably being of the same length and their ends being located in two planes parallel to the plane of the longitudinal axis ZZ' of the hinge.

The length of each of the screw-bolts is at least substantially equal to the distance AB measured along the axis XX' (FIG. 1a and 1b) and separating the plug 14 (point A) from the base of the hinge 21 when the latter is in the bottom position (point B); in other words, when one of the planes of the screw-bolts is at the level of the plug, the other end of each of the screw-bolts is located in the hinge. In particular, the mechanism described enables the screw-bolts 26 to travel, without rotation and in both directions, the distance AC, measured along the axis XX', that separates the plug from the top of the hinge 21 (point C), or any fraction of this distance. It forms a convenient lifting means for facilitating and accelerating all the operations involved in removing and fitting the double-walled cover, namely:

loosening the nuts that secure the plug;
transfer of the plug into the bottom position of the hinge;
transfer of the sealing disc to the bottom position;
transfer of the two discs to the top position;
reversal of operations leading to closure of the opening.

The transfer means provided in accordance with the invention is a surround 27 (FIGS. 1b, 1c, 1d and 1e), which advantageously is in the form of a flanged member 28 of annular cross-section having two flat outer edges 29 and 30. The flanged member 28 is of substantially the same depth as the plug 14 and has a diameter greater than the latter; formed therein are plain holes 31 corresponding to the tapped blind-end holes 18 (FIG. 1a) formed in the plug. It will be readily appreciated that if the surround 27 (FIGS. 1b, 1c, 1d and 1e) is fitted around the plug, all that is needed is to place the screw-bolts 180 (FIG. 1f) in the corresponding holes 31 and 18 to secure the surround to the plug, the position of the surround relative to the plug being adjusted and fixed by known means, for example centering screws 280 (FIG. 1f) engaging in holes 281 (FIG. 1e) formed in the flanged member 28 of the surround. Thus, three fixing screw-bolts 180 and three centering screws 280 can be fitted in the surround, these screw-bolts and screws being advantageously arranged in an equilateral triangle so that together they form a regular hexagon (FIG. 1f).

To provide a lighting means, the surround 27 is associated with the transfer mechanism by means of three iron flats 32 (FIG. 1d) arranged in an equilateral triangle and solidly secured to the surround or, more advantageously, by way of a support ring 320 (FIG. 1e) having an outside diameter greater than that of the surround; the lower edge 30 may be secured to the ring by screws engaging in holes 300 and corresponding holes in the ring. The iron flats and the support ring have plain holes (FIGS. 1d and 1e) formed therein for receiving the screw-threaded end 260 of each of the control screw-bolts 26, and nuts 33 (a nut and a lock-nut) can be screwed on to these ends so that the removable lifting means thus formed enables the plug to be transferred. It will be seen that it is only necessary to remove the nuts 33 or the screw-bolts secured in the holes 300 for the purpose of releasing the transfer mechanism from the surround.

Since the fixing nuts 19 (FIG. 1a) are solidly secured to the plug and particularly because of the thermal expansion of the bolts 16 (of which there may be a total of more than sixteen), loosening of these nuts at the high temperature obtaining is a long and uncomfortable task for men wearing protective clothing, so that provision has been made for initially loosening the nuts 19 by means of known tools (not illustrated in the drawings).

These tools comprise, for example, adaptors for screwing on to the free end 34 of each of the bolts 16. By means of an oil pump connected to the adaptors and brought under pressure, it is possible to apply to the bolts a tensile force which slightly detaches the nuts from the plug; by means of a key introduced into the face of each nut, the latter may be turned and loosened manually, the pump pressure will then be brought to zero and the adaptors unscrewed; the fixing nuts 19 will then be ready to be unscrewed in the normal manner.

According to the invention, a surround having iron flats (FIG. 1d) or a support ring (FIG. 1c) is mounted on the hinge in the bottom position (FIG. 1b) by screwing the nuts 33 on the ends 260 of the control screw-bolts; the surround is moved into a position around the plug 14 (FIG. 1a), and these elements are secured in the manner described and illustrated (FIG. 1f).

The transfer mechanism is then detached either by removing the nuts 33 (FIG. 1d), or, more conveniently, by removing the screw-bolts fitted in the holes 300 in the surround and the ring (FIG. 1e), and the transfer mechanism is brought to the bottom position, the surround remaining on the envelope. A prepared plate (not illustrated in the drawings) is screwed on to the mechanism, on which plate are mounted in exactly the same arrangement as the free ends 34 of the bolts 16, all the adaptors with their oil connexions; this tool-plate is moved mechanically against the plug, preliminary loosening is carried out, the plate is returned to the bottom position and is then removed.

With the transfer mechanism free, it is moved to the lower level of the surround and secured to the surround either by means of the nuts 33 or by means of screw-bolts fitted in the holes 300 (FIGS. 1d and 1e). All the fixing nuts 19 are unscrewed by hand, and the plug, secured to the surround, is brought to the bottom position.

If the cover for the enclosure is of the single-walled type, i.e. if the plug 14 and the sealing disc 12 are solidly connected to each other, removal of the plug uncovers the opening 11 (FIG. 1a) in the enclosure; to uncover the passage completely, the hinge will be brought into the top position (FIG. 1c).

If the cover for the enclosure is of the double-walled type, i.e., if the sealing disc and the plug are screwed on to the envelope separately, removal of the plug uncovers the sealing disc. In principle, this disc would be easy to remove by hand since it is not heavy and it is held on the enveloe 10 (FIG. 1a) only by ordinary screw-bolts 13 (generally milled), but it forms the only barrier between the radioactive enclosure and the personnel.

For obvious safety reasons it is therefore essential that the personnel, although protected by special clothing, should not be needlessly exposed to the radiations when the sealing disc has to be removed from the envelope or refitted thereon after inspection and maintenance work has been carried out.

There should therefore be available a mechanical means for, on the one hand, holding the sealing disc against the opening during unscrewing or screwing up, and on the other hand, for moving said disc from the envelope to the hinge and vice versa.

For this purpose, a plate provided for example with a system for retaining the sealing disc and comprising suction pads, magnets or any other equivalent means (not illustrated), is secured to the surround 27. In the case of a magnet system, the face of the sealing disc that is normally in contact with the plug is made of mild steel. By actuating the transfer mechanism the suction pads or the magnets are applied to the sealing-disc; the disc is thus held against the envelope while the screw-bolts 13 are being loosened. The plate can then be brought into the bottom position with the disc; the opening 11 is then uncovered. Finally, the hinge can be brought into the top position.

The above-described operations in fact enable the double-walled cover to be moved mechanically from the envelope to the top position with the minimum of effort and time and without the risk of irradiation. All that is necessary for replacing the double-walled cover on the envelope is to reverse the order of the operations.

Simply by way of example, a brief description will now be given by components suitable for operating the apparatus 20 and for this purpose reference will be made to FIGS. 2, 3 and 4 of the drawings, wherein the components already mentioned above are designated by the same reference numerals as those used in FIGS. 1a to 1f.

Each of the three control screw-bolts 26 extends through the hinge frame 21 and is engaged by a nut 35, fitted in a mounting 36 with the aid of a brace 37 and a roller-bearing unit 38. A toothed wheel 39, screwed on to each nut 35, thus enables the latter to be turned in situ and therefore enables each screw-bolt 26 to be advanced without being rotated.

A link-chain 40, tensioned by a tensioning unit 41, is pased over the toothed wheels 39 and is fitted around a pulley 42 of a speed-reducing unit 43. A toothed or notched belt 44 transmits to the pulley 42 the rotary movement of a pulley 45 mounted on the shaft of an electric motor 46 able to turn in both directions, so that the three control nuts 45 can be driven in synchronism by the motor 46.

To protect the link-chain 40 and the transmission belt 45, which are particularly vulnerable to the corrosive action of the surrounding atmosphere, cases 47 and 48 respectively are provided for each of them.

The electric motor 46 is hinged on a support 49 displaceable about a shaft by means of an arrangement comprising a screw-threaded tensioning rod 50 and a corresponding support nut 51 for tensioning the transmission belt 44. Also, to cater for possible breakdown of the motor, the pulley 42 is so designed as to receive a removable handle 52 which enables the speed-reduction unit 43 to be driven by hand.

Secured to the chassis-hinge 21 are two uprights 53 and 54, the arrises of which, parallel to the axis XX' of the opening, form two ramps over which corresponding rollers 55, secured to the surround, can move; in moving along said ramps, the rollers are able to take up two components of the weight that are at right angles to these ramps.

Finally, one of the rollers 55 is advantageously associated with a cam 56, and the corresponding upright 53 or 54 is equipped with a removable support for micro-contacts 57 carrying two mechanical remote-control contacts 58 for determining the distance of movement of the surround.

The invention is not of course limited to the embodiment that has been described and illustrated by way of example, and modifications thereto would still fall within the scope of the invention.

I claim:

1. A handling apparatus for facilitating and accelerating the removal and fitting of a heavy cover, particularly a conventional cover either of the double-walled type or of the single-walled type comprising two superposed discs secured over an access opening formed in the envelope for carrying out periodical inspection and maintenance work on the enclosure of either a steam generator or a pressurizing unit of an electro-nuclear station, one of the discs being fitted on the envelope to seal if off, whereas the other, known as the plug and being wider and thicker than the first, is held against the first disc by bolts and fixing nuts to enable the first disc to resist the high pressure obtaining in the envelope and has radially extending tapped blind-end holes for securing it to a transfer device, characterized in that it comprises, firstly, a rigid frame, called a hinge, movable about a fixed axis by a rocking piston-and-cylinder unit attached laterally to the hinge and applied against a fixed point so as to position the hinge in a precise and reproducible manner about the vertical, either to one side of the latter in a "bottom" position parallel to the plan of the double-walled cover, or to the other side in a "top" position, secondly, a transfer mechanism formed by three screw-bolts, perpendicular to the plane of the longitudinal axis of the hinge and called control screw-bolts, which are advantageously arranged in an equilateral triangle and are each in engagement with a nut, called a control nut, mounted in a roller-bearing unit of a mounting integral with the hinge, each nut carrying a toothed wheel and the wheels being interconnected by a chain which may be driven either by an electromechanical unit or by a hand pulley, which unit or pulley is secured to the hinge so as to drive the control nuts in synchronism in situ and thus to impart to the control screws a translatory movement in one direction or the opposite direction between the envelope and the hinge, and thirdly, a load-transfer means, detachably secured by nuts to the transfer mechanism, and adapted to transfer the two discs from the envelope to the upper position and vice versa, and also adapted to transfer the tools required for mechanically removing and fitting said discs.

2. An apparatus according to claim 1, characterized in that the electro-mechanical unit for driving the control screw-bolts comprises an electric motor able to turn in both directions, a toothed or notched belt, a reducing worm-wheel carrying a sprocket wheel engaging the chain, and means for tensioning the belt, the sprocket wheel being equipped with a handle for continuing movement of the chain by hand in the event of breakdown of the motor.

3. An apparatus according to claim 1, characterized in that the load-transfer means may be equipped with two rollers adapted to move, between two limit contacts, on two guide ramps solidly connected to the hinge, the vertical components of the weight of the transfer means thus being taken up by the rollers.

4. An apparatus according to claim 1, characterized in that it comprises, as the transfer means, an open rigid surround advantageously formed by a flanged member of annular crosssection having a diameter greater than that of the plug and having formed therein untapped holes arranged in the same way as the tapped blind-end holes in the plug so that the surround can be secured around the plug by means of screw-bolts, and the surround either being secured on a support ring having a diameter greater than that of the surround and having holes arranged in the same way as the control screw-bolts, or comprising three iron flats having holes arranged in the same way as said screw-bolts, so that the upper ends of the screw-bolts can be fitted and double nuts screwed on to the screw bolts, the surround thus being removably secured to the transfer mechanism and being able to drive the plug away from the envelope to the hinge and vice versa.

5. An apparatus according to claim 4, characterized in that the surround may drive the sealing disc together with the plug when the enclosure is sealed by a cover which is of the single-walled type, i.e. having a sealing disc solidly connected to the plug.

6. An apparatus according to claim 1, characterized in that it comprises, as the load-transfer means, a tool plate, advantageously prepared beforehand, for loosening the nuts which secure the plug, when the plug is screwed on to the envelope and to the surround, and when the transfer mechanism is detached from the surround, the plate, removably connected to the transfer mechanism, being able to apply the tools to the plug and to move it to the bottom position.

7. An apparatus according to claim 1, characterized in that it comprises, as the load-transfer means, a plate equipped with a means for retaining the sealing disc of a double-walled cover, i.e. a cover whose sealing disc is not solidly connected to the plug, over the opening by suction, magnetic or any other equivalent means, when the screw-bolts for securing said disc are not tightened in the corresponding tapped holes in the envelope and when, with the surround held, together with the plug, in the bottom position on the hinge by means of the control screw-bolts extending either through the support ring for the surround or through the iron flats, the plate is secured to the surround, said plate thus being removably connected to the transfer mechanism and being able either to hold the sealing disc over the opening and to move it away therefrom, or to advance it towards the opening and to apply it thereto.

* * * * *